Jan. 30, 1940.　　　　　C. C. TAYLOR　　　　　2,188,559
GOVERNOR
Filed Aug. 18, 1936
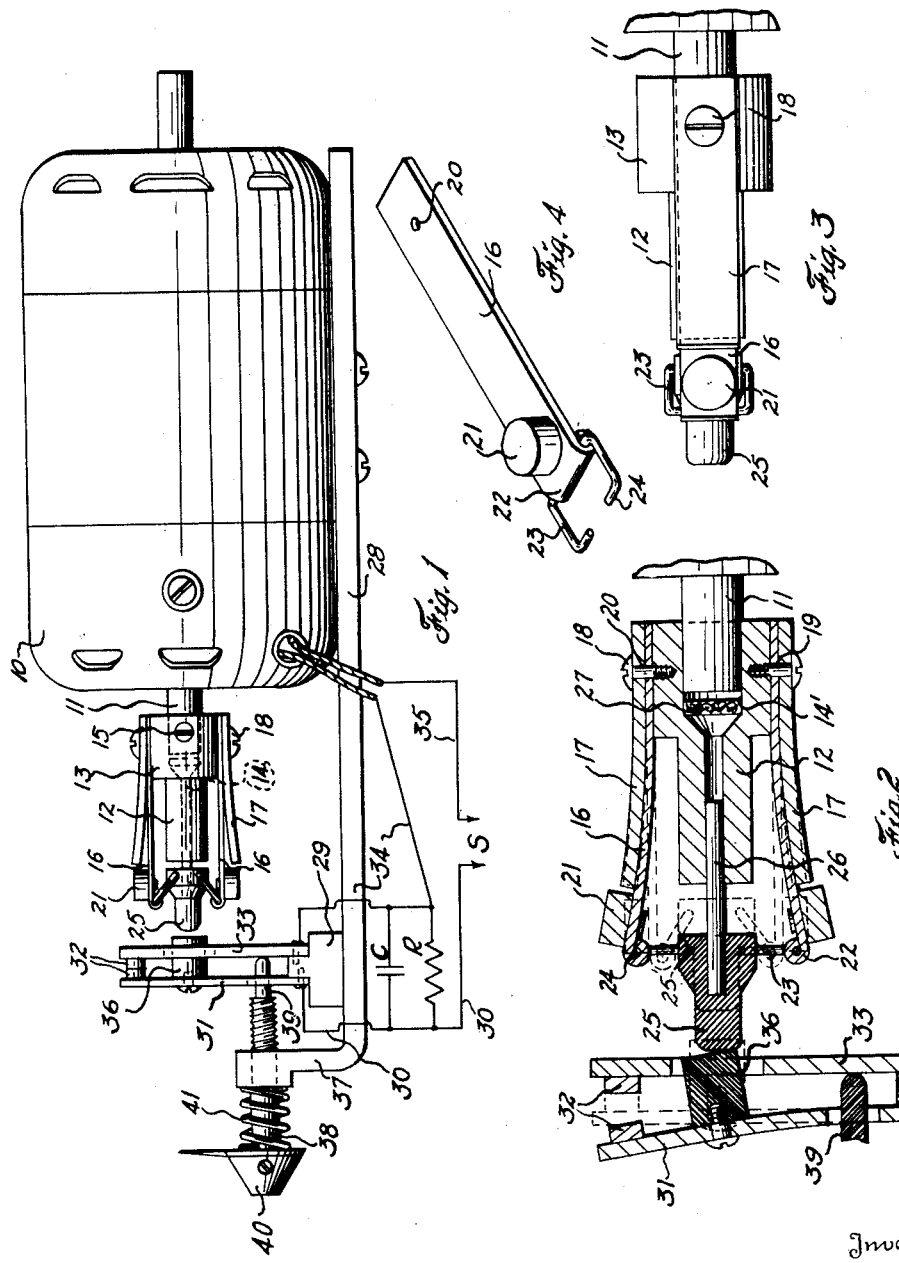
Inventor
CARL C. TAYLOR
By Jack C. Ashley,
Attorney Patented Jan. 30, 1940

2,188,559

UNITED STATES PATENT OFFICE 2,188,559

GOVERNOR

Carl C. Taylor, Brownwood, Tex., assignor to Educational Laboratories, Inc., Brownwood, Tex., a corporation of Texas Application August 18, 1936, Serial No. 96,671

11 Claims. (Cl. 200—80)

This invention relates to new and useful improvements in governors.

One object of this invention is to provide an improved governor particularly adapted for use with an electrically operated motor for controlling the electrical current supplied thereto, whereby the speed of said motor is controlled.

An important object of the invention is to provide an improved governor assembly which is an independent unit and which may be mounted directly on the motor shaft of an electric motor, the governor being operated by the rotation of said shaft.

A further object of this invention is to provide an improved governor for varying the current supplied to an electric motor, said governor being actuated by the motor shaft and having means for controlling the actuation of the governor, whereby the operation of said governor may be held within predetermined limits.

Another object of the invention is to provide with a governor for an electric motor, a switch means for controlling the current supplied to said motor mounted independently of said motor and motor shaft, whereby the difficulties of construction are reduced and greater ease of adjustment is permitted.

A further object of the invention is to provide an improved governor for small electric motors which may readily be attached to all types of small motors without necessitating structural changes.

A construction designed to carry out the invention will be hereinafter described, together with other features of the invention.

The invention will be more readily understood from a reading of the following specification and by reference to the accompanying drawing, in which an example of the invention is shown, and wherein:

Figure 1 is an elevation of the governor and switch assembly mounted on the motor shaft of a small electric motor, Figure 2 is a transverse, vertical, sectional view of the governor assembly and a portion of the switch, Figure 3 is a plan view of the governor assembly, and Figure 4 is an isometric view of one of the spring arm assemblies.

In the drawing, the numeral 10 designates an electrically powered motor which has the usual motor shaft 11 extending therefrom. An elongate cylindrical governor body 12, having an enlarged collar 13 at its inner end, is provided with an axial cylindrical bore 14 extending therethrough. That portion of the bore 14' extending through the collar 13 is enlarged to receive the outer end of the motor shaft 11, and said body may be secured to said shaft by means of a set screw 15 or in any other desired manner. The governor body may be constructed of metal, "Bakelite", or other suitable material.

A pair of elongate flat spring arms 16 are fixed on the outer cylindrical surface of the collar 13 and are located diametrically opposite each other. Each arm has one end fastened to the collar while its other end extends from said collar parallel to the axis of the governor body 12. The spring arms are of such length that their outer ends extend beyond the end of the governor body 12, as clearly shown in Figure 1.

A pair of flat limiting bars or members 17, having substantially the same width as the spring arms 16, have their inner ends overlying the inner ends of said arms. Machine screws 18 pass through openings 19 in the bars and also through openings 20 in the spring arms, and are screwed into the collar 13, whereby both the inner ends of the bars and arms are rigidly fastened to the body 12. Each limiting bar 17 is flared outwardly from its inner end and has a length shorter than the length of the underlying spring arm, whereby the outer end of said spring arm 16 extends beyond the outer end of said limiting bar (Figure 1).

As is clearly shown in Figure 4, the flat spring arms 16 are provided near their outer ends with weights of any desired size, said weights being fixed to the spring arms by rivets or in any other suitable manner. The outer end of each spring arm is bent upon itself to form a bearing 22 which receives a bail or yoke 23 made of a suitable material, such as wire or the like. The yoke is pivoted in the bearing and has its arms extending inwardly toward the body 12, the end of each arm being bent to form a lug 24 (Figure 4).

A cylindrical head 25, having its outer end reduced, has one end of an axial guide pin 26 secured therein. The pin extends rearwardly and is slidable within the bore 14 of the governor body 12. The head 25 is provided with recesses 25' which receive the lugs 24 of the bails 23, whereby said bails form connecting links between said head and the flat spring arms 16.

When the motor is operating, the shaft 11 is, of course, rotating, and as the speed of the motor increases, the speed of rotation of said shaft increases accordingly. Since the governor assembly is fixed on the shaft, it follows that said governor is rotated therewith. Rotation of the assembly causes centrifugal force to act upon the spring arm weights 21 to move said weights outwardly from the axis of rotation, whereby the spring arms 16 are bent to the position shown in Figure 2. It will be clearly seen that as said spring arms are bent outwardly, the balls or yokes 23 move the head 25 forwardly along the axis of rotation, said motion of the head being guided by the pin 26 sliding in the bore 14 of the governor body 12. A lubricant reservoir 27 of felt or other material is contained within the bore 14' of the body whereby the pin 26 is lubricated as it slides within the bore 14 of said body.

In order to vary and control the speed of the motor 10, I have provided a switch assembly mounted on one end of a support 28. It is noted that this support may also have the motor mounted thereon or may be an independent support. The switch assembly consists of a base 29 constructed of insulating material such as rubber or "Bakelite", which base is secured in position on the support 28. Mounted upon the base 29 and extending vertically therefrom is a pair of contact arms 31 and 33. The lower ends of the arms are secured to the base on opposite sides thereof, whereby the base acts to insulate the arms from each other.

In operation, electrical current passes from a source S through a lead 30 to the spring contact arm 31 which arm is electrically connected to the arm 33 through contact points 32 carried by the upper ends of said arms. Said spring arms 31 and 33 normally hold in engagement the contact points 32 by means of their natural spring tension acting toward each other. Thus, the current passes to the arm 33, and then, from said arm, through a conductor 34 to the motor 10. The electrical circuit is completed from said motor through a conductor 35 which returns said current to the source S. Thus, it is obvious that when the contacts 32, carried by the arms 31 and 33, are in engagement, the motor is supplied with current as above described.

An insulating block 36 has one end fixed in some suitable manner to the spring arm 31 and extends, through an opening provided in the spring arm 33, in axial alignment with the head 25 of the governor assembly. The face of said block is spaced from said head, as shown in Figure 1, while the motor is operating at speeds less than the speed desired. When, however, the speed of the motor becomes great enough, whereby the action of the spring arms 16 moving outwardly, as described, forces the head 25 against the face of the projecting block 36, continued movement of said head forces the arm 31 away from the arm 33 to separate the contacts 32. When this occurs, the current cannot flow through the arm 33 to the motor but must flow from the conductor 30 through a resistance R and then through the conductor 34 to the motor. The resistance is of such value that it limits the flow of current to the motor, whereby the speed of the motor shaft is reduced, and is not sufficient to cause the actuation of the governor spring arms by centrifugal force. As soon as the speed of the shaft is reduced, the spring arms 16 immediately return the head 25 to the position shown in Figure 1, thereby disengaging said head from the block 36, whereby the natural spring tension of the arm 31 returns said arm to the position shown in Figure 1, reengaging the contacts 32. Upon said reengagement of the contacts the cycle just described is repeated. A condenser C placed in parallel circuit with the resistance R prevents excessive spark as the contact points 32 are opened and closed.

To obtain a desired speed range, a bracket 37 is fixed to or made integral with the outer end of the support 28 and extends in an upward direction as illustrated in Figure 1. A rod 38 is threaded through the bracket and has a pin 39 of some insulating material extending from its inner end, which pin passes through an opening provided in the arm 31 and engages the arm 33. On the outer end of said rod 38 a suitable control means or knob 40 is mounted. A spring 41 surrounds said rod between the knob 40 and the bracket 37 and acts to frictionally control the rotation of said rod. Actuation of the rod 38, by means of the screw threads moves the pin 39 inwardly against the resilient arm 33, bending said arm inwardly and allowing the arm 31 to move inwardly by spring tension, thus placing the block 36 in a position nearer the head 25. Thus, the decreased space between said block and head limits the speed of the motor by decreasing the amount of axial movement of the head necessary to open the contact points 32. This procedure may easily be reversed allowing the head 25 greater axial travel thus permitting the motor to attain a higher speed before the contacts are opened.

The limiting bars 17 may be flared to a lesser degree than previously described, whereby they restrict, by means of their additional bending resistance, the outward motion of the springs 16, due to the centrifugal effect of the weights 21 acting on said springs. Thus, a greater speed of the motor 10 must necessarily be attained to move the head 25 through a travel identical to that already described as necessary to disengage the contacts 32. It is obvious, therefore, that if the bars 17 are more acutely flared, the springs 16 will be permitted more rapid bending action due to the centrifugal effect of the weights, whereby the head 25 will be moved into actuating contact with the block 36 by a lesser speed of rotation of the motor than was previously necessary. The flare of the bars 17 may easily be changed, either by bending said bars, or by releasing the screw 18 removing the one type and replacing them with the other and again inserting said screw.

It will be seen, then, that by means for controlling the rapid intermittent opening and closing of the contact points by the governor head a balanced control of the speed of rotation of the motor may be easily attained.

What I claim and desire to secure by Letters Patent is:

1. A governor for an electric motor including, a body arranged to be mounted on the shaft of the motor and having an axial bore, a switch assembly mounted independently of said motor, motor shaft and body, means mounted on the body and movable within the bore of the body so as to be movable with relation to the body for operating said switch assembly, movable arms carried by the body and connected with said movable means and actuated by the speed of rotation of the motor shaft, and means for limiting the motion of said movable arms, whereby the switch operating means is moved in accordance with the speed of rotation of said shaft, thereby acting upon the switch assembly.

2. A governor for an electric motor including, a body arranged to be mounted on the shaft of the motor and having an elongate bore, means slidably supported in the bore of the body and movable with relation thereto, movable arms carried by the body and actuated by centrifugal force produced by the speed of rotation of the motor shaft and connected with the movable means for moving said means, means on the body for limiting the action of said arms, a switch assembly mounted independently of the motor, motor shaft and body and operated by the movable means, and means for adjusting said switch assembly with relation to said movable operating means, whereby the movement of said means to operate the switch assembly may be varied.

3. A governor for an electric motor including, a body arranged to be mounted on the shaft of the motor, a movable head slidably mounted in and solely supported by the body and movable with relation thereto, movable arms on the body and connected with the head actuated by centrifugal force produced by the rotation of the motor shaft to move said head, limiting bars overlying the arms for limiting the movement of said arms, a switch assembly mounted independently of said motor, motor shaft and body and operated by the movable head, an adjustable control for moving said switch assembly with relation to said head and varying the relative point of action of the head upon the switch assembly, whereby the movable head is moved in accordance with the speed of rotation of the motor shaft thereby, acting upon the switch assembly.

4. A governor for an electric motor including, a body arranged to be mounted on the shaft of the motor, a switch assembly mounted independently of said motor, motor shaft and body, means movable with relation to the body for operating said switch assembly, movable arms carried by the body and connected with said movable means and actuated by the speed of rotation of the motor shaft, and adjustable means for limiting the motion of said movable arms, whereby the switch operating means is moved in accordance with the speed of rotation of said shaft, thereby acting upon the switch assembly.

5. A governor for an electric motor including, a body detachably mounted on the shaft of said motor and having an elongate bore, a switch assembly mounted independently of said motor, motor shaft and body, means slidably mounted in the body and movable within the bore thereof so as to be movable longitudinally of the body for operating the switch assembly, a pair of arms having one end attached to the body and their opposite ends connected to the movable means, weights on said arms whereby rotation of the motor shaft, body and arms moves said arms outwardly to impart longitudinal movement to the movable means, and means carried by the body and overlying the arms for limiting the outward movement of said arms.

6. A governor for an electric motor including, a body detachably mounted on the shaft of said motor, a switch assembly mounted independently of said motor, motor shaft and body, means slidably mounted in the body and movable longitudinally of the body for operating the switch assembly, a pair of arms having one end attached to the body and their opposite ends connected to the movable means, weights on said arms whereby rotation of the motor shaft, body and arms moves said arms outwardly to impart longitudinal movement to the movable means, means carried by the body and overlying the arms for limiting the outward movement of said arms, the switch assembly including a pair of switch arms having engaging contacts, one of said arms being adapted to be engaged by the movable means to separate the contacts, and a manually operated element for varying the position of the switch arms with relation to the movable means, whereby the movement of the movable means necessary to separate the switch arms is varied.

7. A governor for an electric motor including, a body arranged to be detachably mounted on the shaft of the motor and having an axial extension, movable means slidably supported in said extension whereby it is movable longitudinally of the body, a pair of arms each having one end secured to the body with its opposite end connected to the movable means, weights on said arms whereby rotation of said motor shaft, body and arms moves said arms outwardly to impart longitudinal movement to said movable means, and a control switch located in the path of the movable means, whereby said means is arranged to operate said switch when it has moved a predetermined distance.

8. A governor for an electric motor including, a body arranged to be detachably mounted on the shaft of the motor and having an axial extension, movable means slidably supported in said extension whereby it is movable longitudinally of the body, a pair of arms each having one end secured to the body with its opposite end connected to the movable means, weights on said arms whereby rotation of said motor shaft, body and arms moves said arms outwardly to impart longitudinal movement to said movable means, a control switch located in the path of the movable means, whereby said means is arranged to operate said switch when it has moved a predetermined distance, and a limiting element having a predetermined shape overlying each arm, whereby the outward movement of said arm and the resultant longitudinal movement of the movable means is limited in accordance with the shape of said arm.

9. A governor for an electric motor including, a body detachably mounted on the shaft of a motor, a guide element slidably mounted in the body, a head constructed of insulating material carried by the guide element, and movable longitudinally of the body, a pair of arms each having one end secured to the body with its opposite end connected to the head, weights carried by said arms, whereby rotation of the motor shaft, body and arms moves said arms outwardly by centrifugal action to impart longitudinal movement to the head, and an electric switch located in the path of said head so as to be actuated thereby.

10. A governor for an electric motor including, a body detachably mounted on the shaft of a motor, a guide element slidably mounted in the body, a head constructed of insulating material carried by the guide element, and movable longitudinally of the body, a pair of arms each having one end secured to the body with its opposite end connected to the head, weights carried by said arms, whereby rotation of the motor shaft, body and arms moves said arms outwardly by centrifugal action to impart longitudinal movement to the head, an electric switch located in the path of said head so as to be actuated thereby, and a limiting member associated with each arm and having one end secured to the body with its opposite free end overlying said arm, whereby the outward movement of said arms is limited by said members.

11. A governor for an electric motor including, a body detachably mounted on the shaft of a motor, a guide element slidably mounted in the body, a head constructed of insulating material carried by the guide element, and movable longitudinally of the body, a pair of arms each having one end secured to the body with its opposite end connected to the head, weights carried by said arms, whereby rotation of the motor shaft, body and arms moves said arms outwardly by centrifugal action to impart longitudinal movement to the head, an electric switch located in the path of said head so as to be actuated thereby, and means for adjustably mounting the switch relative to the head, whereby the switch may be engaged by said head at any predetermined speed of the motor shaft.

CARL C. TAYLOR.